Patented Oct. 13, 1925.

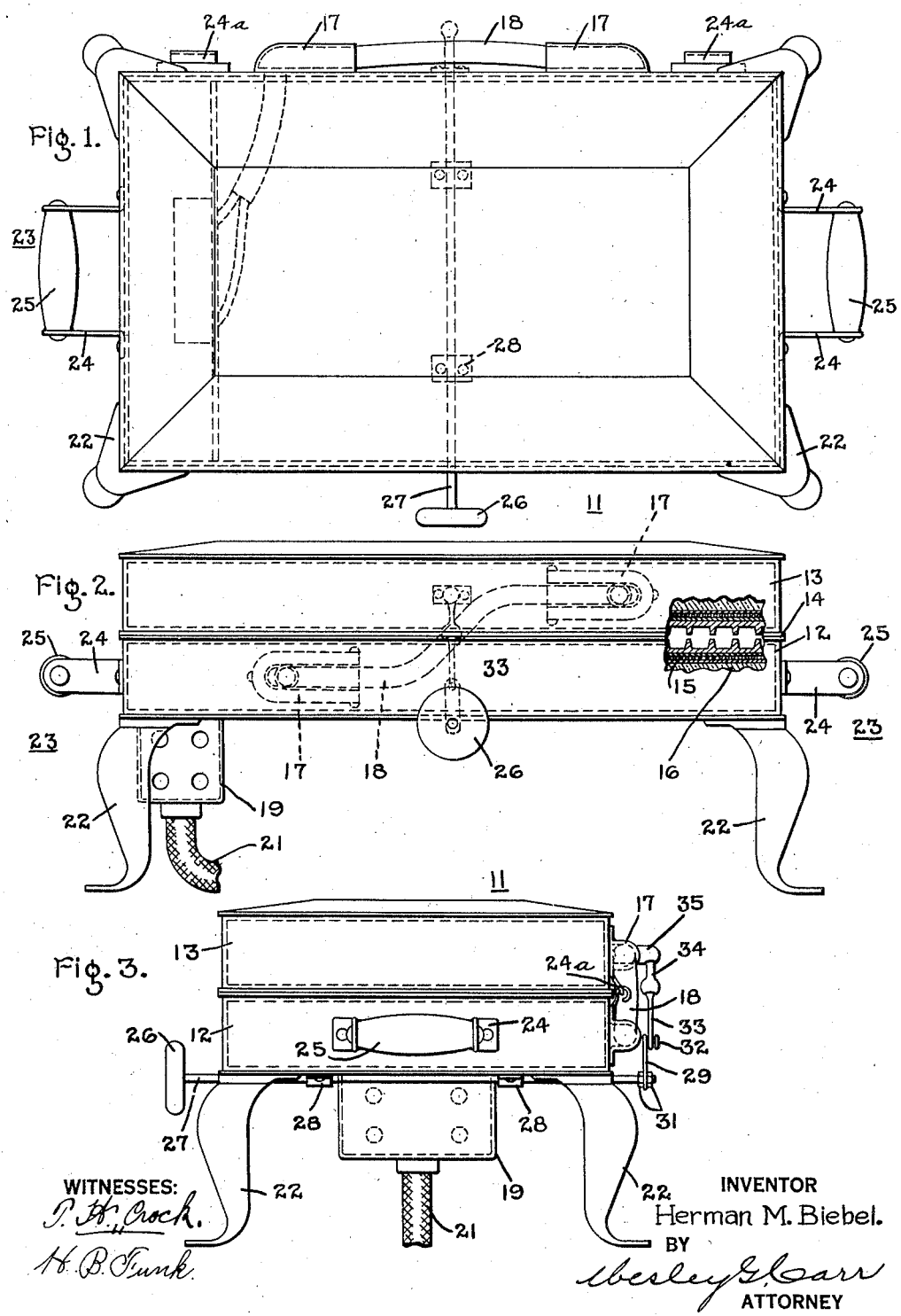

1,557,010

UNITED STATES PATENT OFFICE.

HERMAN M. BIEBEL, OF OAKMONT, PENNSYLVANIA, ASSIGNOR TO WESTINGHOUSE ELECTRIC & MANUFACTURING COMPANY, A CORPORATION OF PENNSYLVANIA.

ELECTRIC WAFFLE IRON.

Application filed July 27, 1922. Serial No. 577,838.

*To all whom it may concern:*

Be it known that I, HERMAN M. BIEBEL, a citizen of the United States, and a resident of Oakmont, in the county of Allegheny and State of Pennsylvania, have invented a new and useful Improvement in Electric Waffle Irons, of which the following is a specification.

My invention relates to electrically-heated devices and, particularly, to electrically-heated waffle irons.

One object of my invention is to provide a relatively simple and compact construction for an electrically-heated waffle iron.

Another object of my invention is to provide, relatively simple and inconspicuous carrying means for an electrically-heated waffle iron.

Another object of my invention is to provide a simple means for actuating the upper casing relatively to the lower casing.

In practicing my invention, I provide a pair of superposed casings, each of which is provided with an electrical heating element and a waffle-baking surface. I provide carrying handles secured to the lower casing at each of the two ends, and means for conducting the current from the heating element of one casing to that of the other casing. I provide a hand-wheel located at the front and bottom of the lower casing mounted with a shaft extending to the back of the casing and having a link connection with the upper casing.

In the single sheet of drawings,

Figure 1 is a top plan view of an electrically-heated waffle iron embodying my invention;

Fig. 2 is a view in front elevation thereof; and

Fig. 3 is a view, in end elevation, of a device embodying my invention.

A waffle iron, designated generally by the numeral 11, comprises a lower metal casing 12 and an upper metal casing 13, which may be of any suitable or desired contour but are here shown as substantially rectangular in shape. Each of the casings is provided with a baking surface 14 of any suitable or desired type usually employed with waffle irons. An electric-heating element 15 is located closely adjacent to each of the baking surfaces 14 and a quantity 16 of a suitable heat-insulating material, such as mineral wool, is placed between the heating elements 15 and the outer wall of the respective casings. The construction just described is not essential and is not a part of my invention, and any suitable or desired construction may be employed.

A socket member 17 is secured to the back wall of each of the casings 12 and 13, and the ends of a flexible armored conduit 18 are located in the respective sockets 17. A conductor member (not shown) is placed within the conduit 18 to permit of electrically connecting the heating elements in the two casings. A terminal box 19 is located on the under surface of the casing 12 and receives the end of a supply-circuit conductor 21 of any suitable or desired construction. Suitable supporting members 22 are provided and operatively engage the lower surface of the lower casing 12.

A pair of handle members 23 comprising metal members 24 and a heat-insulating handle 25 are operatively associated with the lower casing 12. Hinge members 24ª of any suitable or desired construction are secured to the back wall of the respective casings 12 and 13 to permit of varying the angular position of the upper casing relatively to the lower casing.

Means for varying the position of the upper casing relatively to the lower casing comprises a hand-wheel 26, which is located at the front and at the bottom of the lower casing 12 and is suitably secured on a rearwardly-extending shaft 27, which is rotatably mounted in suitable bearing members 28, which are secured against the bottom wall of the lower casing 12. A lever 29 is suitably secured to the shaft 27 at the rear end thereof, as by a plurality of nuts 31 having screw-threaded engagement with the shaft 27. The lever 29 is provided, at its outer end, with a crank pin 32, to which is pivotally connected a link member 33. The outer end of the link member 33 is of substantially ball-shape and operatively engages a socket end of a second link member 34, the other end of which is of ball-shape. The upper end of the link 34 operatively engages the socket end of a lug 35, which is rigidly secured to the rear wall of the upper casing 13 and extends rearwardly therefrom.

When it is desired to open the waffle iron, the hand-wheel 26 is given a turning movement in either direction, causing a turning movement of the shaft 27 and of the lever 29 secured thereto, whereby the crank pin 32 is moved in an arcuate path and in a downwardly direction. This causes the outer end of the lug 35 to be moved downwardly, the two ball-and-socket connections between the respective members 33, 34 and 35 permitting a turning movement of the crank-pin 32 in a direction laterally of the movement of the outer end of the lug 35 and causing a turning movement of the upper casing on the hinged members 24. By suitably selecting the lengths of the members 29, 33, 34 and 35, it is possible to move the upper casing 13 to a position substantially at right angles to the lower casing, when the hand-wheel 26 has been given a turning movement through substantially 180°. A further movement of the hand-wheel permits of the upper casing returning to its normal or closed position.

Various modifications in the details of my invention may be made without departing from the spirit and scope thereof, and I desire, therefore, to be limited only by the scope of the appended claims.

I claim as my invention:—

1. In a waffle iron, in combination, an upper and a lower casing hinged together, a heating element located in each of said casings, a shaft extending laterally of said device and secured thereto at the bottom of the lower casing, a hand wheel secured to said shaft at the front of the casing, and a link motion operatively connecting the rear end of said shaft with the upper casing and operative by a turning movement of said shaft, to raise said upper casing.

2. In a waffle iron, the combination with an upper and a lower electrically heated casing hinged together, of means directly operatively mounted on the lower casing and having a turning movement in one plane, and means connecting said turning means and said upper casing for effecting a turning movement thereof in a plane substantially at right angles to said first plane in accordance with the movement of said turning means.

3. In a waffle iron, the combination with an upper and a lower electrically-heated casing hinged together, of means secured to the bottom surface of said lower casing and having a turning movement relatively thereto, and means operatively connecting said turning means and said upper casing and comprising a ball-and-socket joint for effecting angular movement of said upper casing relatively to said lower casing in accordance with the movement of said turning means.

4. In a waffle iron, the combination with an upper and a lower electrically heated casing hinged together, of means directly operatively mounted on the lower casing and having a turning movement in one plane, and means connecting said turning means and said upper casing for effecting a turning movement thereof in a plane substantially at right angles to said first plane in accordance with the movement of said turning means, said connecting means comprising a plurality of ball-and-socket joints.

5. In a waffle iron, the combination with an upper and a lower electrically-heated casing hinged together, of a shaft rotatably mounted at the bottom of the lower casing and extending from front to back thereof, a hand wheel secured to said shaft at the front of the casing, and a link motion, comprising a plurality of ball-and-socket joints, operatively connecting the rear end of said shaft to the upper casing for varying the angular position thereof relatively to the lower casing in accordance with the turning movement of said shaft.

6. In a waffle iron, the combination with a lower electrically-heated casing, and an upper electrically-heated casing hingedly mounted on said lower casing and having a turning movement relatively thereto, in one plane, of means, directly operatively mounted on said lower casing, for effecting said turning movement of the upper casing by a turning movement in a plane substantially at right angles to the plane of the turning movement of the upper casing.

In testimony whereof, I have hereunto subscribed my name this 13th day of July, 1922.

HERMAN M. BIEBEL.